United States Patent [19]
Keys

[11] Patent Number: 5,725,924
[45] Date of Patent: Mar. 10, 1998

[54] SEALING DEVICE

[75] Inventor: James Frederick Keys, St. Neots, England

[73] Assignee: The Standard Products Company, Cleveland, Ohio

[21] Appl. No.: 502,072

[22] Filed: Jul. 14, 1995

[30] Foreign Application Priority Data

Jul. 14, 1994 [GB] United Kingdom ............... 9414244
Feb. 28, 1995 [GB] United Kingdom ............... 9503968

[51] Int. Cl.⁶ .............................. B60J 10/00; B60R 13/02
[52] U.S. Cl. ................. 428/40.1; 156/71; 293/102; 296/146.7; 296/207; 428/31; 428/41.7; 428/41.8; 428/119; 428/120
[58] Field of Search .................... 428/40.1, 41.7, 428/41.8, 31, 119, 120; 156/71; 24/304; 293/1, 102; 296/146.7, 207

[56] References Cited

U.S. PATENT DOCUMENTS

| | | | |
|---|---|---|---|
| 3,029,173 | 4/1962 | Reinhard | 428/120 |
| 3,059,292 | 10/1962 | Harris | 49/492.1 |
| 3,413,678 | 12/1968 | Krantz | 428/41.7 |
| 3,777,438 | 12/1973 | Brown | 52/718.04 |
| 4,139,664 | 2/1979 | Wenrick | 428/31 |
| 4,546,021 | 10/1985 | Mears | 428/31 |
| 4,822,656 | 4/1989 | Hutter | 428/41.8 |

FOREIGN PATENT DOCUMENTS

| | | |
|---|---|---|
| 2299788 | 8/1976 | France . |
| 2577483 | 4/1986 | France . |
| 3804055A1 | 8/1988 | Germany . |
| 4236817A1 | 6/1993 | Germany . |

*Primary Examiner*—Nasser Ahmad
*Attorney, Agent, or Firm*—Harness, Dickey & Pierce, P.L.C.

[57] ABSTRACT

There is disclosed a sealing device (7) comprising an elongate sealing portion (8) secured substantially along its length to an adhesive means (10) having an outer adhesive surface (11) remote from the sealing portion. The device further comprises a plurality of protruding members (12) positioned at predetermined intervals along its length and having a protruding end (15) protruding from the outer adhesive surface (11) of the adhesive means (10). The protruding members (12) comprise a flat portion (13) of small thickness opposite the protruding end (15). Also disclosed is a sealable body in which the sealing device is used and methods for forming the sealing device.

26 Claims, 2 Drawing Sheets

SEALING DEVICE

BACKGROUND OF THE INVENTION

This invention relates to a sealing device which is locatable on a body member particularly, although not exclusively, on a body member defining a door opening of an automobile, in order to provide sealing of the door against the body member when in a closed position.

Sealing devices are known which are adapted to be positioned on a body around the door opening of an automobile in order to provide sealing with the door when in a closed position. Typically, known sealing devices in this field comprise a resilient elongated sealing portion having a generally flat wall along which is positioned double-sided pressure-sensitive adhesive tape. The outer adhesive surface of the pressure-sensitive adhesive tape is covered by a removable protective layer for storage and transportation of the sealing device. When the device is to be positioned on the body around a door opening, the protective layer is removed and the outer adhesive surface of the double-sided tape is secured on the body around a door opening in order that the resilient sealing portion may abut the door when closed. However, problems have been encountered in locating accurately the outer adhesive surface of the pressure-sensitive tape on to the body around the door opening; for example, the use of jigs is particularly awkward.

SUMMARY OF THE INVENTION

According to a first aspect of the present invention, there is provided a sealing device comprising an elongate sealing portion secured substantially along its length to an adhesive means having an outer adhesive surface remote from the sealing portion, the device further comprising a plurality of protruding members positioned at predetermined intervals along its length and having a protruding end protruding from the outer adhesive surface of the adhesive means, wherein the protruding members comprise a flat portion of small thickness opposite the protruding end.

In a preferred embodiment, the sealing device further comprises a removable protective layer positioned on the outer adhesive surface. The removable protective layer may be provided with pre-pierced holes.

The adhesive means is preferably a double-sided adhesive tape which is secured to the sealing portion along one adhesive side such that the other side forms the outer adhesive surface. The adhesive means may include a pressure-sensitive adhesive and may be in the form of a pressure-sensitive adhesive tape. In one embodiment, the adhesive means is provided with pre-pierced holes through which the protruding end of the protruding members may pass. Thus, in one embodiment, the adhesive means and protective layer may be supplied together with pre-pierced holes passing through both.

The flat portion may be positioned between the sealing portion and the adhesive means or may, in an alternative embodiment, be positioned on the outer adhesive surface of the adhesive means. The flat portion may be round or any geometric shape and, in the embodiment in which it is positioned on the outer adhesive surface, has a sufficiently large area to achieve satisfactory adhesion to the outer surface. The flat portion of the protruding member is preferably of a small thickness such that, in the embodiment in which it is positioned on the outer adhesive surface, the flat portion can be embedded into the adhesive means such that it does not project beyond the majority of the outer adhesive surface or such that the outer adhesive surface is substantially flat in the embodiment in which the flat portion is positioned between the sealing portion and the adhesive means. The flat portion therefore preferably has a thickness of 0.1 to 0.5 mm.

In one embodiment, the protruding end of the protruding members is pointed. In this embodiment, when the protective layer is used and is to be positioned over the outer adhesive layer, it may be so positioned by piercing the protruding ends of the protruding members through the protective layer and placing the protective layer over the outer adhesive surface.

Alternatively, pre-pierced holes may be provided in the protective layer such that when the layer is placed appropriately on the outer adhesive surface of the adhesive means, the protrusions pass through the holes.

The protruding member can be made of any suitable material, but is preferably made of a metal or a plastics material and, even more preferably, is made of ABS. ABS is the generic term for copolymers formed by copolymerising acrylonitrile, butadiene and styrene. These copolymers are light in weight and resistant to chemical and tensile stress.

In one embodiment of the present invention, the protruding member may be barbed or may comprise a "Christmas tree" type fixing, each of which allows insertion through an orifice but, on expansion of the barb or "Christmas tree" type fixing on passing through the orifice prevents removal through that orifice.

The sealing device of the present invention may be used in numerous regions of an automobile body but is particularly suitable for use on the B pillar of the door opening of an automobile.

According to a second aspect of the present invention, there is provided a sealable body comprising a body member and a sealing device according to the first aspect of the present invention, wherein the outer adhesive surface of the adhesive means is capable of adhering to the body member, and wherein the body member has receiving means adapted to receive the protruding members in order to aid location of the sealing device on the body member.

The body member is preferably at least a portion of the door opening surround of an automobile. Alternatively, the body member may be the door of an automobile.

According to a third aspect of the present invention, there is provided a method of producing a sealing device according to the first aspect of the present invention, the method comprising:

providing an elongate sealing portion;

securing to the elongate sealing portion substantially along its length an adhesive means having an outer adhesive surface remote from the sealing portion; and positioning a plurality of protruding members at predetermined intervals with respect to the outer adhesive surface of the adhesive means.

According to a fourth aspect of the present invention, there is provided a method of producing a sealing device according to the first aspect of the invention, the method comprising:

providing an elongate sealing portion;

positioning a plurality of protruding members at predetermined intervals along the elongate sealing portion; and securing to the elongate sealing portion substantially along its length an adhesive means having an outer adhesive surface remote from the sealing portion such that the protruding end of each protruding member protrudes from the outer adhesive surface.

According to a fifth aspect of the present invention, there is provided a method of producing a sealing device according to the first aspect of the invention, the method comprising:

providing an adhesive means having an outer adhesive surface;

positioning a plurality of protruding members at predetermined intervals along the adhesive means such that the protruding end of each protruding member protrudes from the outer adhesive surface; and securing the adhesive means to an elongate sealing portion substantially along its length such that the outer adhesive surface is remote from the sealing portion.

The third, fourth and fifth aspects of the present invention may comprise the further step of positioning a protective layer over the outer adhesive surface of the adhesive means. Additionally, as noted above, the adhesive means may be provided with pre-pierced holes through which the protruding end of the protruding members may pass. The elongate sealing portion may be secured to the adhesive means by pressure means such as, for example, lightly pressured rollers.

In an alternative to both the third and fourth aspects of the present invention, the protruding member may be secured to the adhesive means before attachment to the sealing portion.

BRIEF DESCRIPTION OF THE DRAWINGS

For a better understanding of the present invention, and to show how the same may be carried into effect, reference will now be made, by way of example, to the accompanying drawings, in which.

DESCRIPTION OF THE PREFERRED EMBODIMENTS

Figure 1:
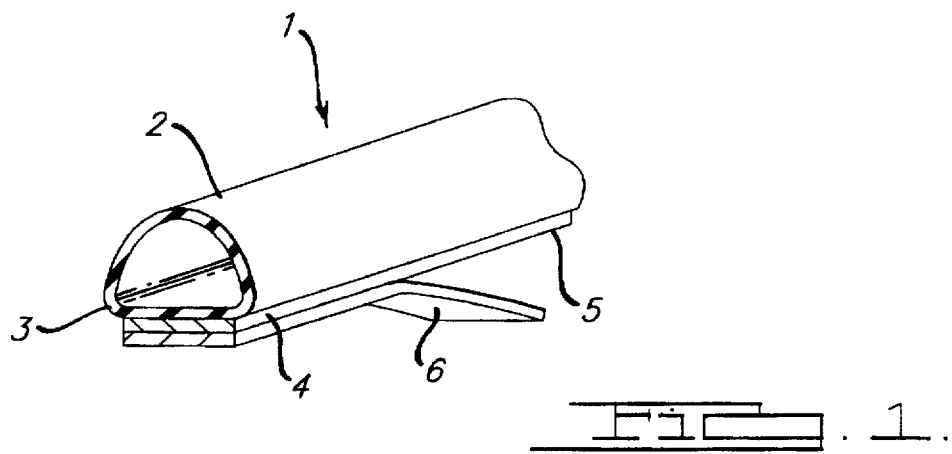
FIG. 1 is a perspective view of a known sealing device.

Referring firstly to FIG. 1, there is shown a sealing device indicated generally by the reference numeral 1 which is known in the art. The sealing device comprises a hollow resiliently flexible sealing portion 2 having a flat wall 3 running along its length. Attached to the flat wall 3 is a length of double-sided pressure-sensitive adhesive tape 4 having an outer adhesive surface 5. A removable protective layer 6 is positioned over the outer adhesive surface 5 of the double-sided tape 4.

When the known sealing strip of FIG. 1 is placed in position for use, for example around a body member defining a door opening of a vehicle, the protective layer 6 is removed and the sealing member 1 is secured around the opening by means of the outer adhesive surface 5 adhering to a body portion of the door opening. When used in a car door opening, the door may then seal against the resiliently flexible hollow sealing portion 2 when it is in a closed position.

Figure 2:
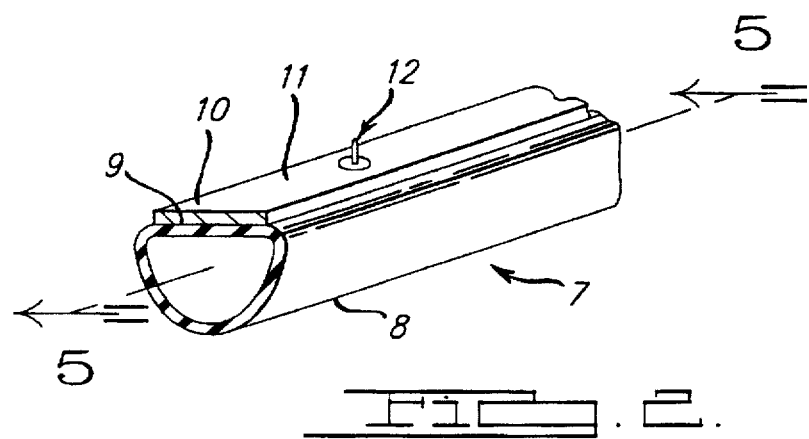
FIG. 2 shows a part of a sealing device in perspective according to one embodiment of the present invention.
Figure 3:
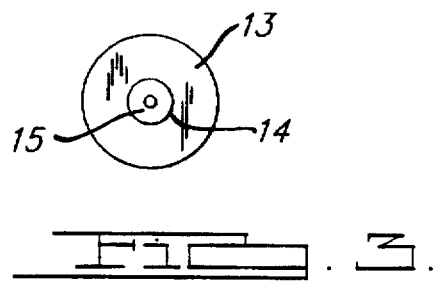
FIG. 3 shows an overhead view of a protruding member forming part of the device of FIG. 2.
Figure 4:
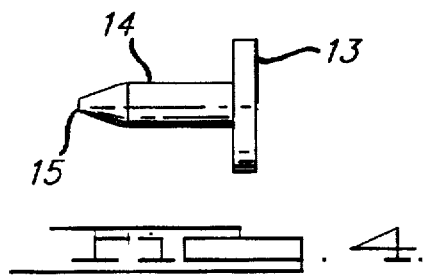
FIG. 4 shows a side view of the protruding member shown in FIG. 3.
Figure 5:
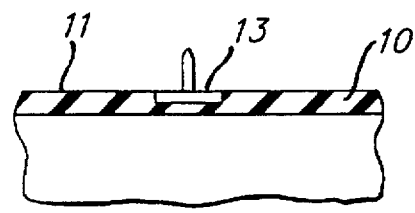
FIG. 5 is a cross-sectional view taken along line V—V of FIG. 2.

Turning now to FIG. 2, there is shown an embodiment of a sealing strip of the present invention, indicated generally by the reference numeral 7. The sealing strip 7 comprises a resiliently flexible hollow sealing portion 8 having a flat wall 9 running along its length on which is secured a length of double-sided pressure-sensitive adhesive tape 10 having an outer adhesive surface 11. Positioned along the outer adhesive surface 11 at predetermined intervals are protrusions, one of which is shown generally at 12. The protrusion is shown in further detail in FIGS. 3 and 4 and comprises a flat portion 13 having a small thickness t. Extending from the flat portion 13 is a main stem 14 having a pointed end 15. It is to be noted that the strip 7 shown in FIG. 2 may further comprise a protective layer similar to protective layer 6 shown in FIG. 1 over the outer adhesive surface 11. Since in the embodiment shown the protrusion 12 has a pointed end 15, this pointed end 15 can be used to pierce any such protective layer when positioning it on the outer adhesive surface 11. The area of the flat portion 13 is large enough to achieve sufficient adhesion of the protrusion 12 to the outer adhesive layer 11. Additionally, as can be seen in FIG. 5, the flat portion 13 is embedded in the double-sided tape 10 such that the flat portion 13 does not extend above the plane of the outer adhesive surface 11.

Figure 6:
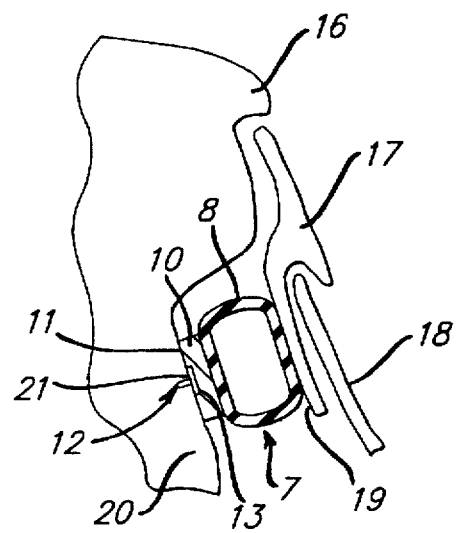
FIG. 6 shows a cross-sectional view of the sealing device of FIG. 2, positioned in the door opening of a vehicle.

The sealing strip 7 is shown in use on a portion of a door frame of a door opening of a vehicle in FIG. 6. A roof header portion of the body opening is shown at 16. A vehicle door 17 closes against the header portion 16 and is provided with a slidable glazing panel 18. A peripheral portion 19 of the door 17 squashes the hollow sealing portion 8 when the door is in a closed position as shown in FIG. 6. This forms a seal between the roof header portion 16 and the door 17. The sealing strip 7 is secured to a body member 20. In the present invention, location of the strip 7 on to the body member 20 is aided by the passing of protrusions 12 through openings in the body portion 20, one of which openings is shown at 21. Since the protrusions 12 and openings 21 are placed at predetermined points on the sealing strip 7 and body member 20 respectively, it is easy to locate the length of the strip 7 around the body member 20 in the region of the opening. Furthermore, lifting of the sealing strip 7 away from the body member 20 is prevented by adhesion of the outer adhesive surface 11 of the double-sided tape 10 to the body member 20. Furthermore, the body member 20 is sealed by means of the double-sided tape 10 surrounding the flat portion 13 of the protrusion 12.

Figure 7:
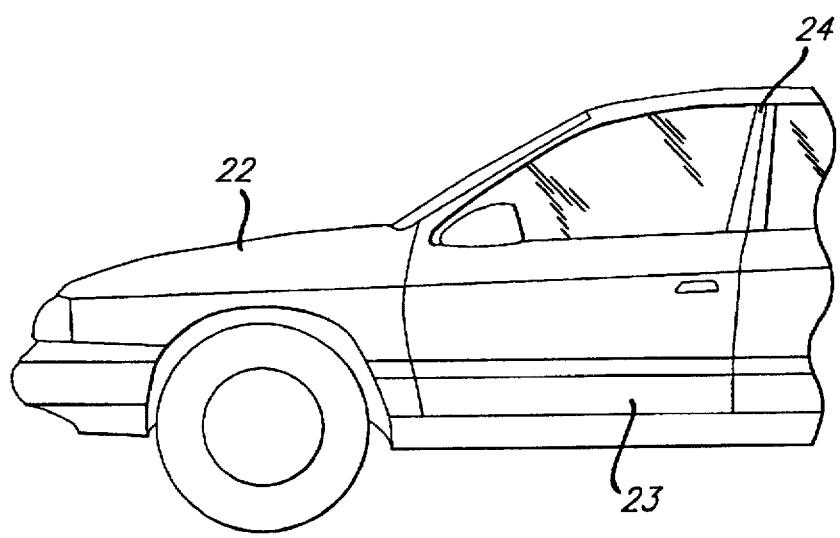
FIG. 7 shows a car, in which the sealing device of the present invention is positioned.

FIG. 7 is a side view of a vehicle shown generally at 22 in which a door 23 is sealed against the body opening 24 by means of the sealing strip of the present invention.

I claim:

1. A sealing device in combination with a vehicle opening of a vehicle, said vehicle opening being defined by at least one vehicle body member, said sealing device comprising an elongated sealing portion having a substantially flat surface running the length of the sealing portion, said sealing portion being secured substantially along its flat surface to an adhesive means having an outer adhesive surface remote from the sealing portion, said outer adhesive surface being secured to the body member, the device further comprising a plurality of protruding members positioned at predetermined intervals along the flat surface and having a protruding end protruding from the outer adhesive surface of the adhesive means, said protruding members being separate members from the sealing portion, said body member including receiving means receiving the protruding members, wherein the protruding members comprise a flat portion opposite the protruding end, said flat portion having a thickness that is less than a thickness of the adhesive means, and wherein the flat portion does not extend beyond the plane of the outer adhesive surface.

2. A sealing device according to claim 1, further comprising a removable protective layer positioned on the outer adhesive surface.

3. A sealing device according to claim 2, wherein the protective layer is provided with pre-pierced holes.

4. A sealing device according to claim 1, wherein the adhesive means is a double-sided adhesive tape which is secured to the sealing portion along one adhesive side such that the other side forms the outer adhesive surface.

5. A sealing device according to claim 1, wherein the adhesive means includes a pressure-sensitive adhesive.

6. A sealing device according to claim 5, wherein the adhesive means is in the form of a pressure-sensitive adhesive tape.

7. A sealing device according to claim 1, wherein the adhesive means is provided with a plurality of pre-pierced holes through which the protruding end of the protruding members may pass.

8. A sealing device according to claim 1, wherein the flat portion is positioned between the sealing portion and the adhesive means.

9. A sealing device according to claim 1, wherein the flat portion is positioned on the outer adhesive surface of the adhesive means.

10. A sealing device according to claim 9, wherein the flat portion has a sufficiently large area to achieve satisfactory adhesion to the outer surface.

11. A sealing device according to claim 9, wherein the flat portion is of sufficiently small thickness such that it can be embedded into the adhesive means such that it does not project beyond the majority of the outer adhesive surface.

12. A sealing device according to claim 1, wherein the flat portion has a thickness of 0.1 to 0.5 mm.

13. A sealing device according to claim 1, wherein the protruding end of the protruding members is pointed.

14. A sealing device according to claim 1, wherein the protruding member is made of an acrylonitrile butadiene styrene plastic.

15. A sealing device according to claim 1, wherein the protruding member is an expansion fixing.

16. A sealable body in combination with a vehicle opening of a vehicle, said sealable body comprising a vehicle body member and a sealing device, said sealing device comprising an elongated sealing portion having a substantially flat surface running the length of the sealing portion, said sealing portion being secured substantially along its flat surface to an adhesive means having an outer adhesive surface remote from the sealing portion, the device further comprising a plurality of protruding members positioned at predetermined intervals along the flat surface and having a protruding end protruding from the outer adhesive surface of the adhesive means, said protruding members being separate members from the sealing portion, wherein the protruding members comprise a flat portion opposite the protruding end, said flat portion having a thickness less than a thickness of the adhesive means, wherein the flat portion does not extend beyond the plane of the outer adhesive surface, and wherein the outer adhesive surface of the adhesive means is of adhering to the body member, and wherein the body member has receiving means receiving the protruding members in order to aid location of the sealing device on the body member.

17. A sealable body according to claim 16, wherein the body member is at least a portion of a door opening surround of an automobile.

18. A sealable body according to claim 16, wherein the body member is a door of an automobile.

19. A method of producing a sealing device and attaching the sealing device to a vehicle body member defining an opening of a vehicle, said method comprising the steps of:

providing an elongate sealing portion, said sealing portion including a substantially flat surface extending the length of the sealing portion;

securing to the elongate sealing portion substantially along the flat surface an adhesive means having an outer adhesive surface remote from the sealing portion;

positioning a plurality of protruding members at predetermined intervals with respect to the outer adhesive surface of the adhesive means, said protruding members including a flat portion having a thickness less than a thickness of the adhesive means, wherein the flat portion does not extend beyond the plane of the outer adhesive surface, said protruding members being separate members from the sealing portion;

securing the outer adhesive surface of the adhesive means to the body member; and positioning the plurality of protruding members within receiving openings in the vehicle body member.

20. A method of producing a sealing device according to claim 19, further comprising the step of positioning a protective layer over the outer adhesive surface of the adhesive means.

21. A method of producing a sealing device and attaching the sealing device to a vehicle body member defining an opening of a vehicle, said method comprising the steps of:

providing an elongate sealing portion;

positioning a plurality of protruding members at predetermined intervals along the elongate sealing portion, said protruding members being separate members from the sealing portion;

securing to the elongate sealing portion substantially along its length an adhesive means having an outer adhesive surface remote from the sealing portion such that the protruding end of each protruding member protrudes from the outer adhesive surface, said protruding members including a flat portion having a thickness less than a thickness of the adhesive means, wherein the flat portion does not extend beyond the plane of the outer adhesive surface;

securing the outer adhesive surface of the adhesive means to the vehicle body member; and positioning the plurality of protruding members within receiving openings in the vehicle body member.

22. A method of producing a sealing device according to claim 21, further comprising the step of positioning a protective layer over the outer adhesive surface of the adhesive means.

23. A method of producing a sealing device and attaching the sealing device to a vehicle body member defining an opening of a vehicle, said method comprising the steps of:

providing an elongate sealing portion;

providing an adhesive means having an outer adhesive surface;

positioning a plurality of protruding members at predetermined intervals along the adhesive means such that the protruding end of each protruding member protrudes from the outer adhesive surface, said protruding members being separate members from the sealing portion, said protruding members including a flat portion having a thickness less than a thickness of the adhesive means, wherein the flat portion does not extend beyond the plane of the outer adhesive surface;

securing the adhesive means to an elongate sealing portion substantially along its length such that the outer adhesive surface is remote from the sealing portion;

securing the outer adhesive surface of the adhesive means to the vehicle body member; and positioning the plurality of protruding members within receiving openings in the vehicle body member.

24. A method of producing a sealing device according to claim 23, further comprising the step of positioning a protective layer over the outer adhesive surface of the adhesive means.

25. A sealing device comprising an elongated sealing portion having a substantially flat surface running the length of the sealing portion, said sealing portion being secured substantially along its flat surface to an adhesive means having an outer adhesive surface remote from the sealing portion, the device further comprising a plurality of protruding members positioned at predetermined intervals along the flat surface and having a protruding end protruding from the outer adhesive surface of the adhesive means, said protruding members being separate members from the sealing portion, said adhesive means including a plurality of pre-pierced holes through which the protruding end of the protruding means may pass, wherein the protruding members comprise a flat portion opposite the protruding end, said flat portion having a thickness that is less than a thickness of the abrasive means, and wherein the flat portion does not extend beyond the plane of the outer adhesive surface.

26. A sealing device comprising an elongated sealing portion having a substantially flat surface running the length of the sealing portion, said sealing portion being secured substantially along its flat surface to an adhesive means having an outer adhesive surface remote from the sealing portion, the device further comprising a plurality of protruding members positioned at predetermined intervals along the flat surface and having a protruding end protruding from the outer adhesive surface of the adhesive means, said protruding members being separate members from the sealing portion, said protruding members are expansion fixings, wherein the protruding members comprise a flat portion opposite the protruding end, said flat portion having a thickness that is less than a thickness of the adhesive means, and wherein the flat portion does not extend beyond the plane of the outer adhesive surface.

* * * * *